US 7,555,590 B2

(12) United States Patent
Elliot et al.

(10) Patent No.: US 7,555,590 B2
(45) Date of Patent: Jun. 30, 2009

(54) FAST BUFFER POINTER ACROSS CLOCK DOMAINS

(75) Inventors: Paul Elliot, Bristol (GB); Peter Bennett, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 155 days.

(21) Appl. No.: 11/545,079

(22) Filed: Oct. 6, 2006

(65) Prior Publication Data

US 2007/0139085 A1 Jun. 21, 2007

(30) Foreign Application Priority Data

Oct. 10, 2005 (EP) .................................. 05256294

(51) Int. Cl.
*G06F 13/14* (2006.01)
(52) U.S. Cl. .................. 710/305; 713/400; 713/401; 375/354
(58) Field of Classification Search .................. 710/305; 713/400, 401; 326/94; 375/354
See application file for complete search history.

(56) References Cited

U.S. PATENT DOCUMENTS

| | | | | | |
|---|---|---|---|---|---|
| 4,185,273 | A | * | 1/1980 | Gowan | 341/70 |
| 4,700,347 | A | * | 10/1987 | Rettberg et al. | 714/700 |
| 5,118,975 | A | * | 6/1992 | Hillis et al. | 327/158 |
| 5,414,832 | A | * | 5/1995 | Denneau et al. | 713/401 |
| 5,630,086 | A | * | 5/1997 | Marietta et al. | 711/5 |
| 5,867,695 | A | | 2/1999 | Amini et al. | |
| 5,892,927 | A | * | 4/1999 | Boehmer et al. | 710/100 |
| 6,055,285 | A | * | 4/2000 | Alston | 375/372 |
| 6,081,849 | A | * | 6/2000 | Born et al. | 710/7 |
| 6,114,890 | A | * | 9/2000 | Okajima et al. | 327/170 |
| 6,247,137 | B1 | | 6/2001 | Wickeraad | |
| 6,373,312 | B1 | * | 4/2002 | Barnes et al. | 327/261 |
| 6,466,718 | B1 | * | 10/2002 | Linnell | 385/100 |
| 6,594,329 | B1 | | 7/2003 | Susnow | |
| 6,889,310 | B2 | * | 5/2005 | Cismas | 712/201 |
| 6,906,555 | B2 | * | 6/2005 | Ma | 326/94 |
| 6,946,870 | B1 | * | 9/2005 | Lesea | 326/38 |
| 6,968,436 | B2 | * | 11/2005 | Kumazawa | 711/167 |
| 7,065,132 | B2 | * | 6/2006 | Schuster | 375/211 |
| 7,072,817 | B1 | * | 7/2006 | Carey | 703/14 |
| 7,288,969 | B1 | * | 10/2007 | Sleigh et al. | 326/94 |
| 7,319,345 | B2 | * | 1/2008 | Farjad-rad et al. | 327/99 |
| 7,363,526 | B1 | * | 4/2008 | Chong et al. | 713/401 |

OTHER PUBLICATIONS

Fishburn, John. Clock Skew Optimization. IEEE Transactions on Computers. vol. 39, No. 7, Jul. 1990.*
Lockyear et al. Optimal Retiming of Level-Clocked Circuits Using Symmetric Clock Schedules. IEEE Transactions on Computer-Aided Design of Integrated Circuits and Systems. vol. 13, No. 9, Sep. 1994.*
Liu et al. Retiming and Clock Scheduling for Digital Circuit Optimization. IEEE Transactions on Computer-Aided Design of Integrated Cicruicts and Systems. vol. 21, No. 2, Feb. 2002.*

* cited by examiner

*Primary Examiner*—Mark Rinehart
*Assistant Examiner*—Matthew D Spittle

(57) ABSTRACT

Retiming circuitry for retiming a data signal transmitted from a first environment under control of a first clock signal to a second environment under control of a second clock signal, said first and second clock signals having a known repeat relationship, the retiming circuitry comprising a plurality of delay elements for delaying said data signal; a plurality of inputs connected to said delay elements for receiving said data signal at respectfully different delays; selection means for selecting the data signal at one of said inputs based on said known repeat relationship; and an output for outputting said selected data signal.

21 Claims, 9 Drawing Sheets

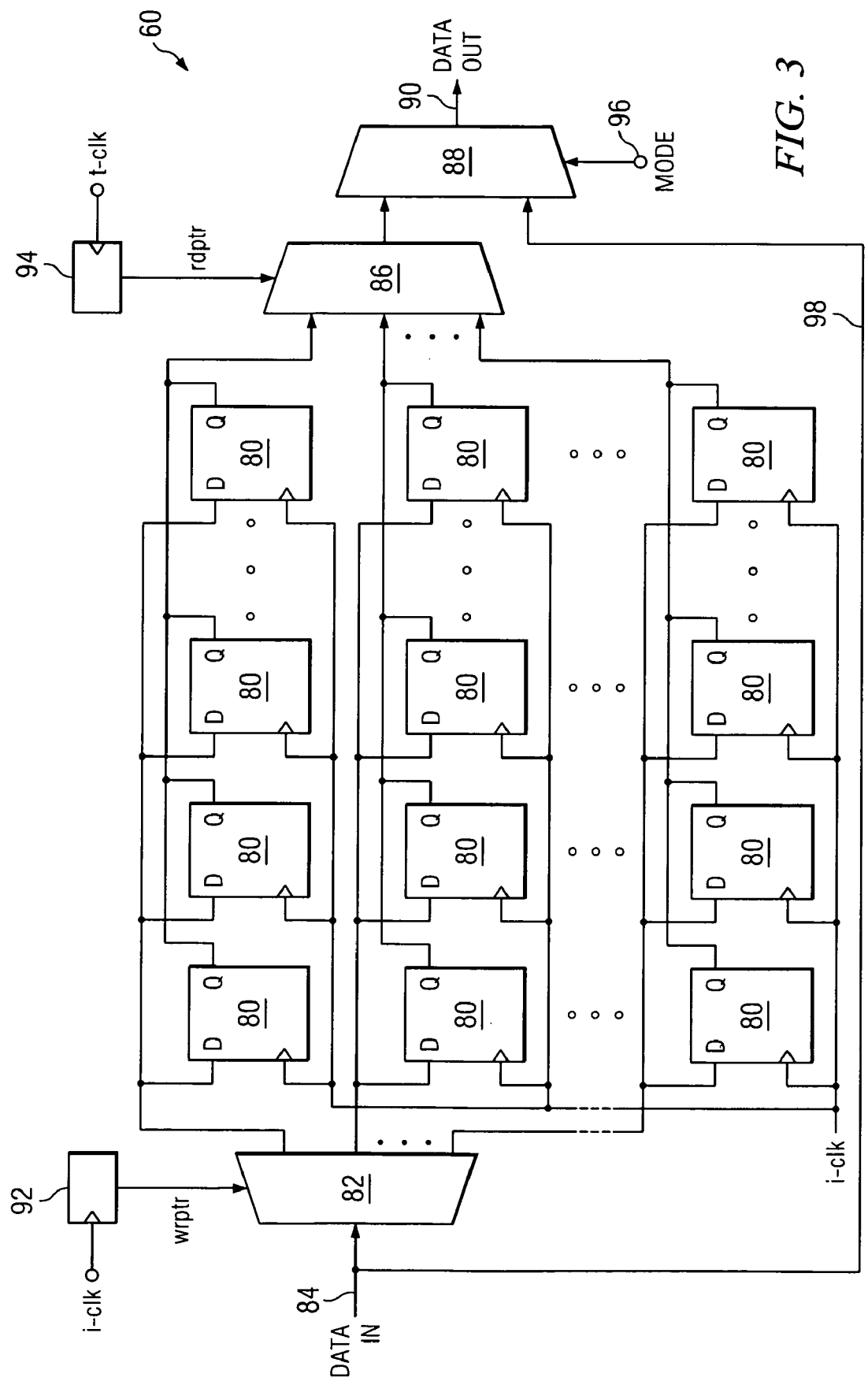

FAST BUFFER POINTER ACROSS CLOCK DOMAINS

CROSS-REFERENCE TO RELATED APPLICATION AND CLAIM OF PRIORITY

The present application is related to European Patent No. EP05256294.9, filed Oct. 10, 2005, entitled "FAST BUFFER POINTER ACROSS CLOCK DOMAINS". European Patent No. EP05256294.9 is assigned to the assignee of the present application and is hereby incorporated by reference into the present disclosure as if fully set forth herein. The present application hereby claims priority under 35 U.S.C. §119(a) to European Patent No. EP05256294.9.

TECHNICAL FIELD

The present disclosure relates to a retiming circuit for retiming signals between clock domains.

BACKGROUND

To gain maximum performance in all new system on chip (SoC) designs, each circuit or section on the chip is designed to run at a certain frequency, which is often a different frequency to other circuits in the system. This allows the design of each circuit to trade performance and area with frequency. For example, a particular circuit such as a CPU (central processing unit) core may require high performance, and therefore will need to run at a high clock frequency, however this may require greater chip area than lower frequency designs. On the other hand, another circuit, such as a memory interface, may not need to run at such a high clock frequency, and therefore could be designed to take up less chip area.

Each circuit in the system must be able to communicate with other circuits, and in order to allow data to be successfully passed between circuits it must be re-timed. For fast changing asynchronous signals (signals with no clock relationship), this requires a method like the Valid-Ack protocol. According to this protocol, a valid signal is sent from one circuit, for example IP1, to the other circuit, for example IP2. This valid signal is retimed in IP2's clock domain, using a certain number of resynchronizers (generally D-type flip-flops) which clock the data at the IP2's clock frequency. The number of resynchronizers required depends on the two frequencies of the respective clocks and the D-type characteristics of the flip-flops, however, for most situations two flip-flops are sufficient in order to avoid metastability problems.

Once the valid signal has been retimed and detected, IP2 is able to latch any data sent with the valid signal. It then sends back an Ack (Acknowledge) signal which indicates to IP1 that it has received and sampled the data. IP1 is then able to change the data and send a new valid signal to IP2 to indicate that new data is available.

This valid ack protocol has two distinct problems. Firstly, the latency of the signal can be quite high (typically six cycles). Secondly and more importantly, the bandwidth of the data change is much lower than the respective frequencies of the circuits, as to move each block of data will take the number of clock cycles required by the protocol, which is typically six cycles. This leads to poor performance of the system.

The use of resynchronizers between clock domains also adds latency to the system. For example, if two resynchronizers are used, a delay of up to two clock cycles will be added to the system every time signals are retimed across the clock boundary. This is clearly disadvantageous and will mean that the latency, and to some extent the bandwidth of the system is reduced.

SUMMARY

This disclosure provides a circuit for retiming signals between clock domains.

In one embodiment, the present disclosure provides a circuit for retiming a data signal transmitted from a first environment under control of a first clock signal to a second environment under control of a second clock signal. The circuit includes a plurality of delay elements for said data signal and a plurality of inputs connected to said delay elements for receiving said data signal at respectively different delays. The circuit further includes a multiplexer to select the data signal at one of said inputs based on a delay select value. The first and second clock signals have a known repeat relationship and wherein a varying phase relationship between said first and second clock signals repeats. The circuit also includes a delay select logic circuit to provide delay select values. The delay select values depend on said known repeat relationship, each one of said delay select values defining the delay to be provided in a given clock cycle. The circuit also includes an output for said selected data signal.

In another embodiment, the present disclosure provides a method of retiming a data signal transmitted from a first environment under control of a first clock signal to a second environment under control of a second clock signal. The first and second clock signals have a known repeat relationship wherein the varying phase relationship between said first and second clock signals repeats with a known frequency. The method includes delaying said data signal by different delays to generate a set of delayed data signals. The method also includes selecting one of said delayed data signals based on said known repeat relationship. Finally, the method outputs the selected data signal.

In still another embodiment, the present disclosure provides an integrated circuit comprising a circuit for retiming a data signal transmitted from a first environment under control of a first clock signal to a second environment under control of a second clock signal. The integrated circuit includes a plurality of delay elements for delaying said data signal. The integrated circuit also includes a plurality of inputs connected to said delay elements for receiving said data signal at respectively different delays. The integrated circuit further includes a multiplexer to select the data signal at one of said inputs based on a delay select value. The first and second clock signals have a known repeat relationship wherein a varying phase relationship between said first and second clock signals repeats. The integrated circuit further includes a delay select logic circuit to provide delay select values, said delay select values depending on said known repeat relationship, each one of said delay select values defining the delay to be provided in a given clock cycle. Finally, the integrated circuit includes an output for said selected data signal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of this disclosure and its features, reference is now made to the following description, taken in conjunction with the accompanying drawings, in which like reference numerals represent like parts, and in which:

FIG. 3 is a block diagram of a FIFO storage device as used in the bridge circuit of FIG. 2;

DETAILED DESCRIPTION

Embodiments of the present disclosure are described in the context of an ASB (Asynchronous Bus) which contains a dual ported RAM (Random Access Memory). In the described embodiment, the ASB is set up as first in first out (FIFO) storage circuits, wherein one port of the RAM may be clocked by a first device which writes data into the port, and another port of the RAM is clocked by a second device which can read the information out of the RAM. Accordingly, two pointers are used to synchronize the data.

A read pointer is maintained by the second device and is incremented every time data is read. Similarly, a write pointer is incremented by the first device every time it writes data. The first device uses the read pointer in the second device to know there is space to write into the RAM. However, to get access to this information the read pointer must be retimed across the clock boundary. The read pointer is represented in binary form as a number of bits. The read pointer is "Gray encoded" which means that only one bit of the read pointer value ever changes when the pointer increments. This allows the read pointer to be retimed using only one or more resynchronizers and no valid/ack signals need be transmitted, or as in one embodiment of the present disclosure, other retiming circuitry may be used.

Once in the first device's clock domain the read pointer value is "gray decoded" and can then be compared with the write pointer. If there is free space in the RAM, the first device can write the new data to the RAM and increment the write pointer. Otherwise, the first device will wait for the second device to read data and for the new pointer to be transferred across the clock domain. Accordingly, latency is reduced and the maximum bandwidth, which is determined by the lowest frequency of the two devices, can be achieved.

It will be apparent to those skilled in the art that although embodiments of the present disclosure are described in relation to read and write pointers in an asynchronous bridging circuit, the present disclosure could be applied to the transfer of other data across clock domains in a variety of other circuits, for example input/output buffers. Embodiments of the present disclosure are particularly applicable to the transfer of data or signals between two different clock domains. For example, embodiments of the present disclosure can be incorporated in a system having an embedded CPU.

Figure 1:
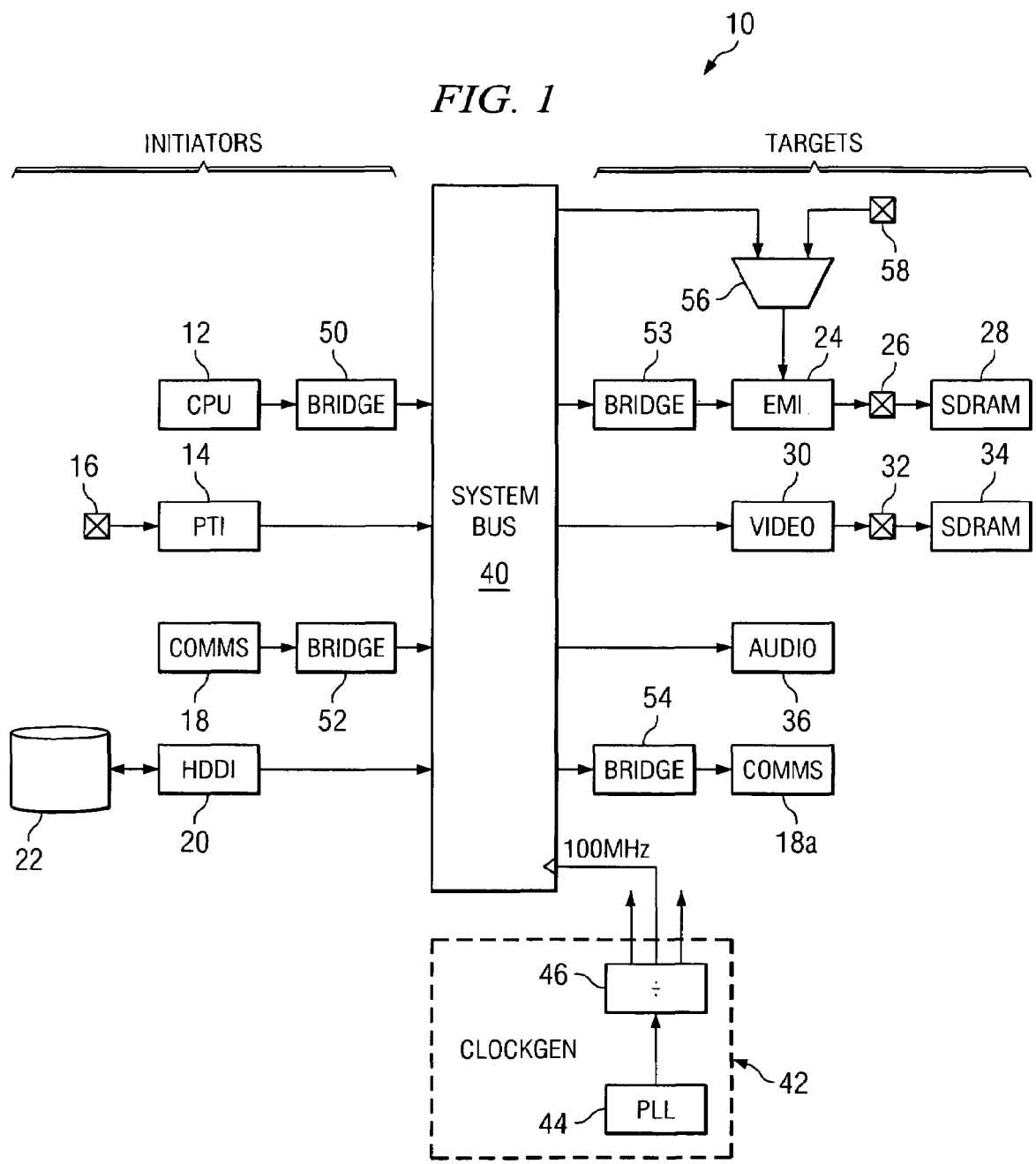
FIG. 1 is a block diagram of an integrated circuit having a CPU, a system bus, and a plurality of peripherals, with which a bridge circuit embodying one embodiment of the present disclosure can be used.

FIG. 1 is a block diagram of a semiconductor integrated circuit or chip in which a bridge embodying the invention can be employed. Integrated circuit 10 is of the 'system on a chip' type and includes a plurality of initiator circuits, a system bus, and a plurality of target circuits. It is possible for some circuits to be both initiators and targets, as discussed below.

The initiators shown on the left-hand side of FIG. 1 include a central processing unit or CPU 12, a program transport interface 14 with associated external connection pins 16, and a communications circuit 18. Communication circuit 18 may include a UART (Universal Asynchronous Receiver-Transmitter) and a direct memory access controller for example. Other initiators may be provided including a hard disk drive interface HDDI 20 coupled to a hard disk 22.

The targets shown on the right-hand side of FIG. 1 include an external memory interface (EMI) 24 connected through external connection pins 26 to an external memory in the form of an SDRAM 28, a video circuit 30 also connected through external connection pins 32 to an SDRAM 34, and an audio circuit 26. In fact the video RAM 34 may be capable of being used generally as part of the system memory. The communications circuit may also be a target and is thus shown also on the right-hand side of FIG. 1 as the communications circuit 18a. All the initiators and targets are coupled to a system bus 40 to facilitate communication between each. In principle, any initiator can initiate communication with any target through the bus 40.

The integrated circuit 10 also includes a clock generator circuit 42 which has a phase-locked-loop (PLL) 44 and a divider chain 46. The bus 40 is clocked at one of the frequencies generated by the clock generator. For example, in this the bus may be clocked at 100 MHz.

With an arrangement as shown in FIG. 1, problems arise because the clock speeds used by the various peripherals are not the same. For example, while the bus 40 is clocked at 100 MHz, for example, the CPU 12 might for example operate at about 166 MHz. Similarly the external memory interface and the communications controller 18, 18a may operate at a different speed from the bus 40. Divide chains 46 are provided to generate each clock required, however the clocks are generally generated from the same master clock generated by the PLL 44. Unless all the circuits on the chip are only run at the slowest speed, there is a need to accommodate the differing clock speeds.

To allow different circuits to operate at different clock speeds, the integrated circuit of FIG. 1 is provided with bridge circuits to accommodate changes between clock speeds. As shown, a bridge circuit 50 is included between the CPU 12 and the bus 40, a bridge circuit 52 is included between the external memory interface 24 and the bus 40, and a bridge circuit 54 is included between the communications circuit 18, 18a and the bus 40.

Some circuits may be adapted to run at an externally-received clock rate as well. This is illustrated in FIG. 1 by the EMI 24, which is clocked through a selector 56. The selector 56 receives and selects between internal clock pulses and clock pulses received at an external connection pin 58.

Figure 2:
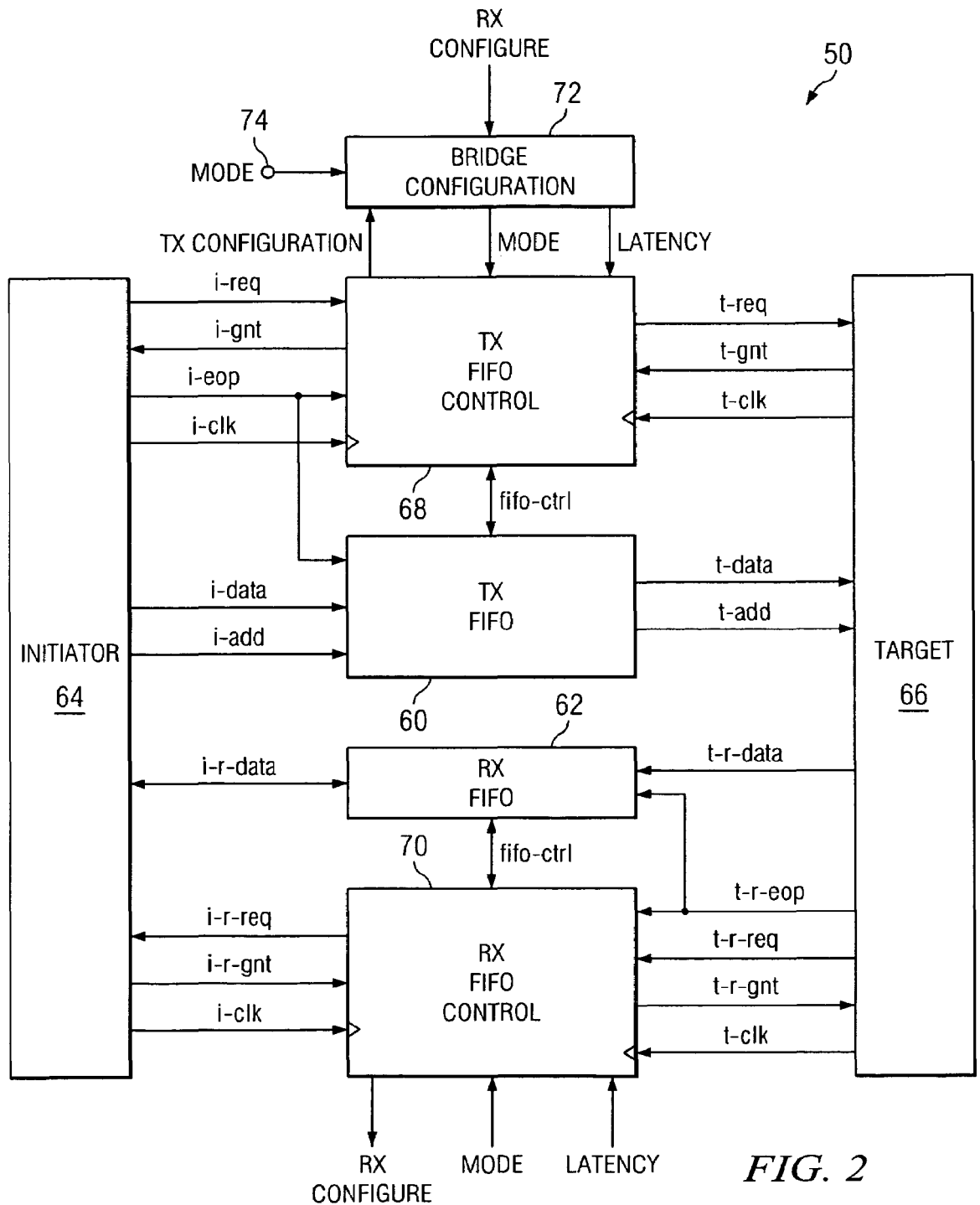
FIG. 2 is a block diagram of a bridge circuit embodying one embodiment of the present disclosure and used in the integrated circuit of FIG. 1.

FIG. 2 illustrates the structure of one of the bridge circuits, namely the bridge circuit 50. Bridge circuits 50, 52 and 54 are essentially the same. The bridge circuit 50 is built for two storage buffers shown as FIFO (first in, first out) storage circuits 60 and 62, as will be described later in more detail herein.

A first FIFO circuit 60 is a transmit FIFO and used for traffic from the initiator 64 to the target 66. In the case of the bridge circuit 50, the initiator 64 is the CPU 12 and the target 66 is effectively the system bus 40 so far as the bridge circuit is concerned. The second FIFO circuit 62 is the receive FIFO and is used for responses from the target 66 to the requests from the initiator 64. Two storage buffer control circuits are provided. A transmitter FIFO control circuit 68 controls the transmit FIFO 60 and a receive FIFO control circuit 70 controls the receive FIFO 62. A bridge configuration controller 72 is coupled to both the transmit and receive FIFO control circuits 68, 70.

The bridge configuration controller 72 receives a MODE command signal at an input 74 and provides mode control signals to both the transmit and receive FIFO control circuits 68, 70. The bridge configuration controller 72 receives a transmission configuration signal from the transmit FIFO control circuit 68 and a reception configuration signal from the receive FIFO control circuit 70.

The transmit FIFO 68 receives initiator data and address information over lines i-data and i-add from the initiator 64. The transmit FIFO 68 supplies the data and address information to the target over lines t-data and t-add. Any response to a request from the initiator is returned by the target to the receive FIFO 70 over a line t-r-data and is transferred by the FIFO 70 to the initiator 64 over a line i-r-data. Other lines to and from the transmit FIFO 60 and receive FIFO 62 carry opcode, priority, source identification and target identification signals as will be understood by those skilled in the art, and will not be described in detail here.

The transmit FIFO control circuit 68 receives an initiator request signal i-req from the initiator 64 and generates at an appropriate time a target request signal t-req. The FIFO control circuit 68 returns an initiator grant signal i-gnt and the target returns a target grant signal t-gnt when appropriate. The initiator provides both to the transmit FIFO control circuit and to the transmit FIFO 60 an end-of-packet signal i-eop. Finally, the transmit FIFO control circuit receives both initiator clock pulses i-clk and target clock pulses t-clk. The transmit FIFO control circuit 68 is coupled to the transmit FIFO 60 by fifo-ctrl lines to control the operation of the transmit FIFO 60 as described below.

The receive FIFO control circuit 70 and the receive FIFO 62 are similarly connected to the initiator and the target for transmission in the opposite direction. From now on, the receive function will not be described in detail as it is simply the reverse of the transmit function.

The basic construction of the transmit FIFO 60 is shown in FIG. 3. The FIFO circuit 60 consists of a chosen number of rows, preferably 2n, here eight rows or blocks 18 of D-type flip-flops 80, each block or bank containing 77 flip-flops which allows each block to receive one word of data in the system in which the bridge is being used. A distributor switch 82 is connected to a data input 84 and distributes an incoming word to a desired one of the eight blocks in dependence upon a write pointer (wrptr) signal received by the distributor 82. A selector switch 86 selectively connects a desired one of the blocks to an output in dependence upon a read pointer (rdptr) signal received by the selector 86. The output of the selector 86 is applied to one input of a second selector 88, the other input of which is connected directly to the input 84 by a bypass line 98. The selector 88 is controlled by a mode signal, as described below, received at an input 96, so that the FIFO circuit 60 can be bypassed in a synchronous mode where the initiator and target clocks are the same, using the bypass line 98. The output 90 of the selector 88 constitutes the output of the FIFO circuit 60.

Clock pulses are applied to the circuit of FIG. 3 as follows. All the D-type flip-flops 80 are clocked by initiator clock pulses i-clk, with each row selected by a multiplexer. The write pointer is also clocked by the initiator clock pulses i-clk, and to that end is received from a counter 92 which is clocked by i-clk. The read pointer however is clocked by the target clock pulses t-clk, and to that end is received from a counter 94 which is clocked by t-clk.

In the receive FIFO circuit 62, the D-type flip-flops and the write pointer are clocked by t-clk, and the read pointer is clocked by i-clk. The receive FIFO also contains less D-type flip-flops in each block, as less signals are buffered in the return path direction.

The FIFO circuit 60 shown in FIG. 3 operates as a rotary buffer as diagrammatically illustrated in FIG. 4. The write pointer will always point to a different block from the read pointer. Assume that the pointers are initially addressing two blocks as shown in FIG. 4a. That is the write pointer is addressing block 1 and the read pointer is addressing block 0. If a new word is received, the write pointer is incremented by one, and the new word is written into block 2. This is shown at in FIG. 4b. If another new word arrives this is written into block 3, and the pointers are as shown in FIG. 4c. If now a word is read from the FIFO circuit 60, then the read pointer will be incremented by one.

Figure 4A:
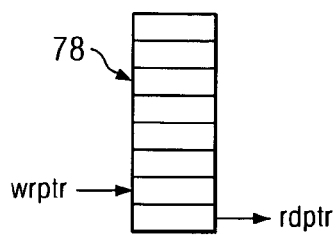
FIGS. 4a-4e illustrate the writing to and reading from the FIFO storage device and the change in the related write pointer and read pointer values.
Figure 4B:
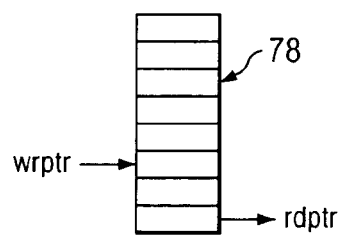
Figure 4C:
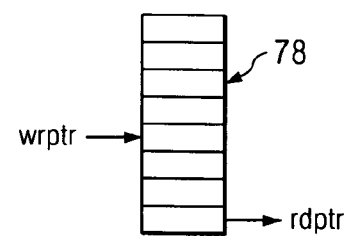
Figure 4D:
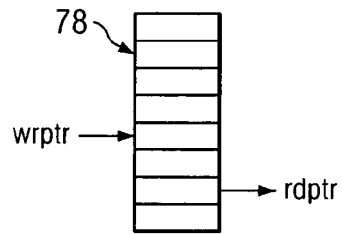
Figure 4E:
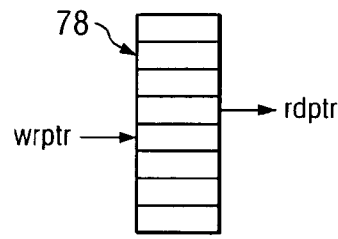

The FIFO circuit 60 has a limit which is defined as the difference in blocks between the write and read pointers, or more accurately the number of blocks by which the write pointer is ahead of the read pointer. If words continue to be written into the FIFO circuit 60 faster than they are withdrawn the position of maximum limit will be reached. An example of this is shown in FIG. 4c where there is a limit of seven (7). At this point a read must take place before any further data can be received.

When a bridge circuit such as, for example, bridge circuit 50 is used in an arrangement shown in FIG. 1, the circuit can be used to form words into batches of up to eight words before they are sent onto the bus, thus increasing the efficiency of the usage of the bus 40. As will be described below, the FIFO according to one embodiment of the present disclosure is configurable as desired to optimize the flow of traffic from the peripheral circuits over the bus. The data is buffered in both directions by having both the transmit FIFO 60 and the receive FIFO 62. While described as having eight blocks 78 in each buffer, the size, or depth, of the FIFO can be chosen to be different from one application to another. The width can also be changed to accommodate different word sizes.

FIG. 2 illustrates the operation of the bridge circuit 50. Initially the initiator 64 will make a request by asserting i-req, that is giving it value 1 instead of value 0. If the transmit FIFO 60 is ready to receive data, the transmit FIFO control circuit 68 will send an i-gnt signal to the initiator 64. If the transmit FIFO 60 is full or otherwise unable to accept data the i-gnt signal will not be generated. The data word from the initiator 64 is then clocked into the transmit FIFO 60, using the rising edge of the i-clk pulses.

After a predetermined time delay, the t-req signal to the target is asserted. The predetermined time delay is preferably when contents of the FIFO, that is the FIFO depth, reaches the programmed or preset limit. Alternatively, the time delay could be a predetermined number of clock cycles of either buffer input or output clock. If the target is able to receive data it returns a t-gnt signal. With both t-req and t-gnt equal to 1, data is now clocked out of the transmit FIFO. A t-req will also be generated if an end of packet signal is received, that is i-eop=1, indicating that this word is the last in a packet.

Once the t-req signal is asserted, whether because the limit is reached or because an end of packet indicator is received, it is de-asserted or returned to zero only when the transmit FIFO becomes empty, all data having been clocked out of it. Thus, the transmit FIFO 60 is allowed to fill up, and when it is full, all the data in it is transmitted onto the bus. The transmit FIFO thus provides a hold-off function which promotes improved bus efficiency. This is particularly useful with direct memory accesses for example.

It will be appreciated that the receive FIFO 62 operates similarly. The receive FIFO control circuit 70 controls the flow of return data from the target interface to the receive FIFO through to the initiator interface. When t-r-req=1 and t-r-gnt=1, return data is clocked into the receive FIFO 62 on the rising edge of t-clk. The t-r-gnt signal is asserted so long as the receive FIFO 62 is not full. When the receive FIFO receives its programmed latency, which may be the same as or different from the programmed latency of the transmit FIFO, then the signal i-r-req is asserted to initiate transfer back to the initiator. The i-r-req signal is also asserted on receipt of the last word in a packet from the target. Data is clocked out of the receive FIFO while i-r-req and i-r-gnt are both at logic 1.

Once the signal i-r-req is asserted it is pulled to logic 0 only when the depth of the receive FIFO is zero, that is when it is empty. Both the latency of the transmit FIFO and the latency of the receive FIFO are configurable, so that t-req or i-r-req can be programmed to become asserted where there are one, two, three or up to $2n$, preferably eight words loaded into the transmit FIFO or receive FIFO respectively. The latency configuration is described in more detail below. The degree of hold-off provided is thus variable from zero up to a maximum Value determined by the size of the FIFOs.

Figure 5:
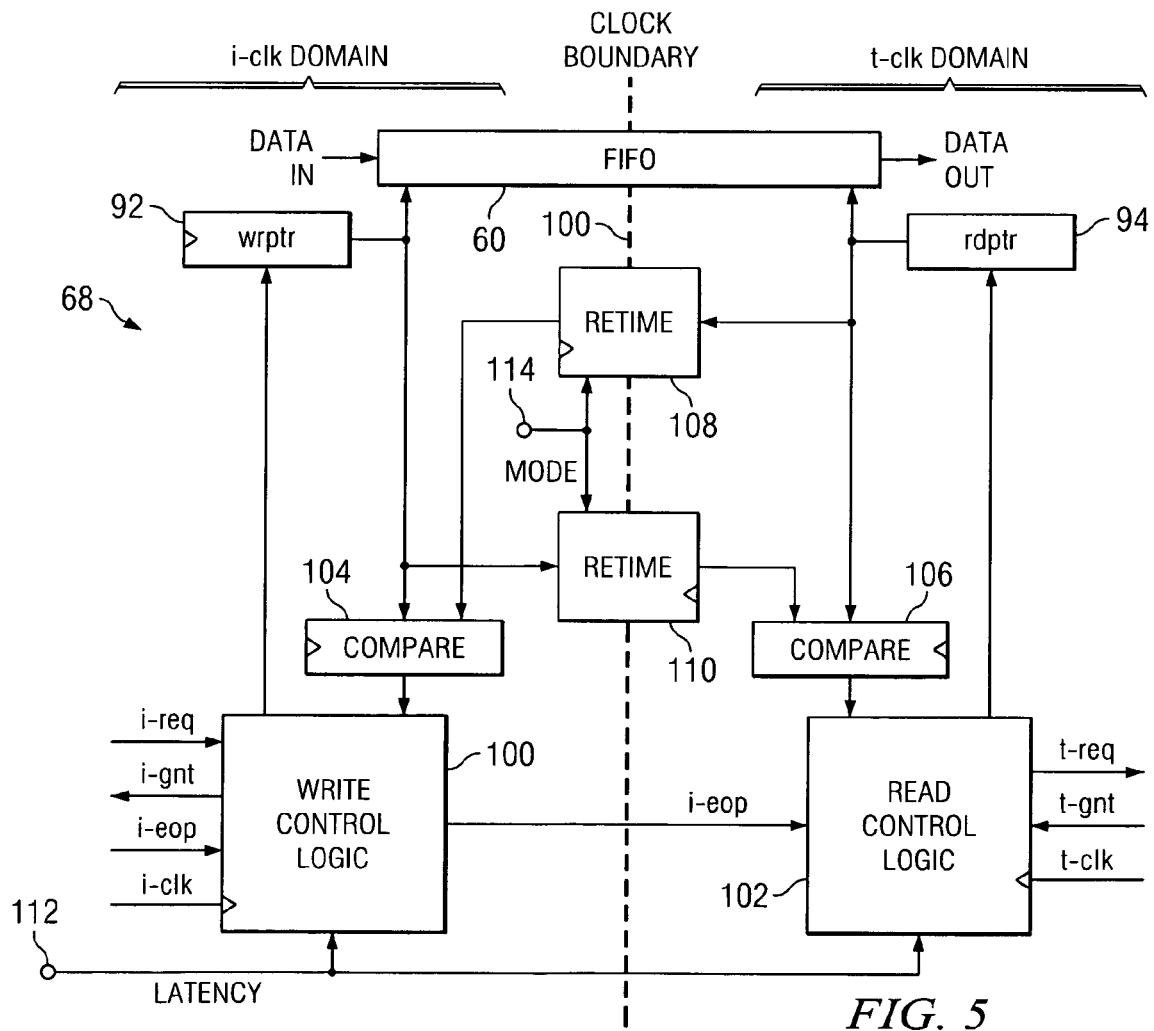
FIG. 5 is a block diagram of a FIFO control circuit in the bridge circuit of FIG. 2.

The transmit FIFO control circuit 68 will now be described in more detail with reference to FIG. 5 of the drawings. FIG. 5 illustrates transmit FIFO 60 shown in FIG. 3 together with the write pointer counter or register 92 and the read pointer counter or register 94. FIG. 5 also illustrates at 100 the clock boundary between the i-clk domain (generally illustrated as the left side of FIG. 5) and the t-clk domain (generally illustrated as the right side of FIG. 5). The clock inputs to the circuits are not shown for reasons of clarity.

The write pointer held in counter 92 is controlled by write control logic 100 and the read pointer held in counter 94 is controlled by read control logic 102. Each control logic block (e.g. write control logic 100 and read control logic 102) may take the form of a state machine and receives the output of a respective comparator, which in turn receives the values of both the write and read pointers. However, the write control logic 100 and read control logic 102 blocks and comparators 104 and 106 are in different clock domains. Thus, comparator 104, clocked by i-clk, receives the write pointer value directly from the counter 92 and receives the read pointer from the counter 94 after retiming in a first retiming circuit 108. The output of the comparator 104 is applied to the write control logic 100. A comparator 106 clocked by t-clk receives the read pointer value directly from the counter 94 and receives the write pointer from the counter 92 after retiming in a second retiming circuit 110. The output of the comparator 106 is applied to the read control logic 102.

The comparators 104 and 106 compare the values of the write and read pointers. From this comparison comparators 104 and 106 can determine whether FIFO 60 is full, empty, almost full (where just one word can be written into the FIFO), and almost empty (when just one word is left in the FIFO). The write counter 92 is incremented when data is written into the FIFO 60 (provided it is not full) and the read counter 94 is incremented when data is being read from the FIFO 60 (provided it is not empty), as illustrated above with reference to FIG. 4. The maximum permitted contents of the FIFO 60 for it to be treated as full, is a set limit.

The control logic blocks 100 and 102 are also coupled to the initiator 64 and target 66 interfaces so that the operation is as follows. Provided that the comparison of the write and read pointers made by the comparator 104 shows that the FIFO 60 is not full, when i-req is received the write control logic asserts i-gnt. Data can then be received and written into the FIFO 60, the write pointer being incremented by the write control logic 100 with each received word. When the comparator 104 determines that the FIFO 60 is full, further writing and incrementing is stopped and i-gnt de-asserted.

When the FIFO 60 becomes full, t-req is asserted. It is also asserted if an end of packet signal has been received. Provided that the comparison of the write and read pointers made by the comparator 106 shows that the FIFO 60 is not empty, t-req remains asserted. Assuming the target is ready to receive the data, t-gnt is received by the read control logic 102, and data is read out of the FIFO 60. The read pointer is incremented by one with each word read from the FIFO 60 and transmitted to the target. When the comparator 106 determines that the FIFO 60 is empty, further reading and incremented is stopped and t-req de-asserted.

Figures 6, 8:
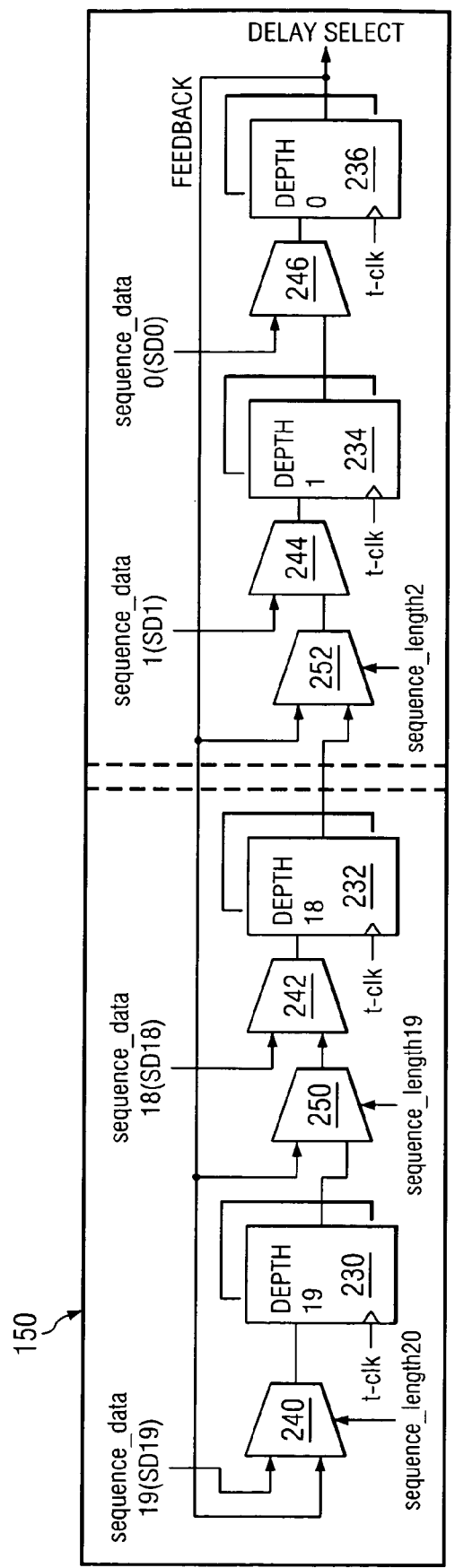
FIG. 6 is a table illustrating the filling and emptying of the FIFO in response to changes in write and read pointer values.
FIG. 8 is a diagram of circuitry for generating a clock signal according to one embodiment of the present disclosure.

An example of the way in which the FIFO 60 fills up and empties is seen in table shown in FIG. 6. The table illustrates a succession of values for the write pointer and read pointer. The word count in the FIFO 60 is equal to the difference between the pointer values modulo size, where size is preferably $2n$. The bottom line of the table shows when the FIFO 60 is empty and when it is full.

The corresponding receive FIFO control circuit 70 for the receive FIFO 62 is similarly constructed. Response data is clocked into the receive FIFO 62 so long as t-r-req and t-r-gnt are asserted, using t-clk as the clock. When the FIFO 62 is full, t-r-gnt is de-asserted. For reading, I-r-req is then asserted, and on receipt of i-r-gnt the FIFO contents are read out until the FIFO 62 is determined to be empty. The write pointer is incremented as words are written into the FIFO 62 and the read pointer is incremented as words are read out of the FIFO 62.

The retiming circuits 108,110 in FIG. 5 will be described with reference to FIG. 7. Retiming circuit 110 is illustrated, however retiming circuit 108 is identical save that i-clk and t-clk are interchanged. It will be noted from FIG. 5 and FIG.

6 that the retiming circuits receive a MODE signal at an input 114. This is (or is part of) the same MODE signal that is applied to input 96 in FIG. 3.

Before describing the construction of the retiming circuit, it should be noted that the FIFO 60 and FIFO 62 can operate in four modes, as determined by the MODE signal.

Mode One. Semi-synchronous with No Retime.

Mode 1 is generally used when the initiator and target clocks are related such as simple ratios 1/2, 2/1, 3/2, 3/1, etc. This relationship means that, provided the two clock division trees are balanced with respect to each other, data can be passed between the two clock domains without asynchronous re-time pointers. The two clock trees should be balanced as one, with minimal skew. This assumes simple clock ratios e.g. 1:2, 2:1 and a well balanced internal clock tree.

In some cases, two clocks that are relatively synchronous may never have points where metastability is an issue. In this case, mode one operation may be used.

Mode Two. Semi-synchronous with Delay Select Logic According to an Embodiment of the Present Invention.

Mode two may be used when i-clk and t-clk are phase related but of a different frequency (e.g. when i-clk and t-clk are generated from the same source but subject to different frequency division). The i-clk will be a multiple of the t-clk or vice versa. The i-clk or t-clk need not necessarily be an integral multiple but may be a ratio of small integers of, say, less than ten. As an example, i-clk may be 120 MHz and t-clk 100 MHz. To minimize latency in the system, delay select logic circuitry may be used. Delay select logic circuitry will be described in more detail herein after.

Mode Three. Semi-Synchronous With One Retime Buffer.

Operation in mode three is an alternative to using the delay select logic used in mode two. Preferably, mode three is used for simple ratios between the clocks where the edges never get so close that they are unsafe. A single retime stage between the clock domains may be used to improve the static timing from the write or read counter to the end of the comparison operation. A single retime stage between the clock domain is especially useful to overcome clock skew and short path delay, which can arise when the two clocks are very close in frequency. An extra D-type flip-flop is used to compensate for poorly balanced clock trees.

Mode Four. Asynchronous With Two Retime Buffers.

The fourth mode is an asynchronous mode. In the fourth mode the clock signals are derived from different sources. In this case, two re-time stages are used in accordance with normal practice to ensure proper retiming by minimizing metastability. It should be appreciated that additional or alternative clock masking may be used. Mode four may be used in lieu of mode two or in addition to mode two. Clock masking may be used in conjunction with mode one in some embodiments of the present disclosure. For example, if the xth clock cycle in one clock domain coincides with the yth clock cycle in another clock domain, data is delayed from being written, read or transferred until the next clock cycle. Clock masking of this sort may be implemented with an arrangement comprising two counters. For example, if the clocks coincided every fourth cycle in the first clock domain and every fifth cycle in the second clock domain, the first counter for the first domain would count to four and the second counter for the fifth domain would count to five. When the first counter reaches four, the data is delayed from for example being written until the next clock cycle and when the second counter reaches five, the data is for example delayed from being read.

In some embodiments of the present disclosure, it may be the writing operation may be permitted whilst the reading operation is delayed.

Figure 7:
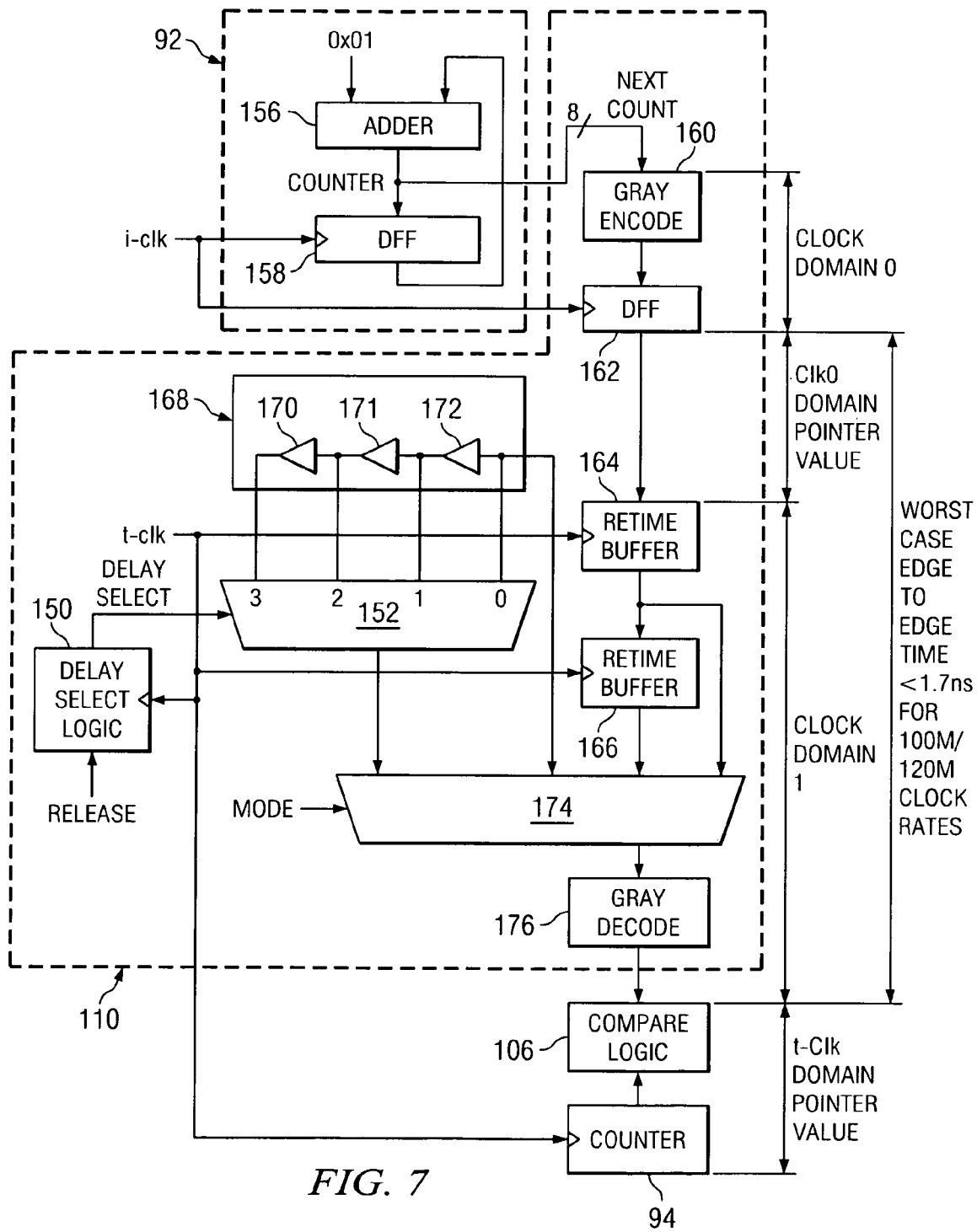
FIG. 7 is a diagram of a retiming circuit in the FIFO control circuit of FIG. 5 according to one embodiment of the present disclosure.

FIG. 7 depicts the retiming circuit 110 according to one embodiment of the present disclosure. Write pointer wrptr 92, which is also shown in FIG. 5, comprises an adder block 156 and D flip-flop 158. The write pointer circuit 92 is effectively a counter, which counts on the next rising edge of clock signal i-clk after a new data word is received to be stored in the FIFO. Adder 156 has two inputs, a first input which is connected to the output of D flip-flop 58, and a second input which is connected to the value '1', represented in 8 bits. On rising edge of i-clk, after a new data word arrives in the FIFO, adder 156 adds 1 to the output of D flip-flop 158. Thus, a count value is proved at the adder output. The count value is connected to the input of the D flip-flip 158.

According to one embodiment of the present disclosure, the count value is output by the adder 156, and is 8 bits in length. Thus, a pointer value of between 1 and 255 is allowed. However, in alternative embodiments, the number of bits for the count value may be greater or fewer than 8 bits. Thus, a higher count for the counter is allowed. Accordingly, the desired maximum count value will be determined by the size of the FIFO memory.

The output from write pointer 92 is Gray encoded by Gray encode block 160. As explained previously, Gray encoding ensures that the data changes by only one bit on every count from one byte to the next. The output from the Gray code block 160 is then clocked by D flip-flop 162, using clock i-clk. The signal from the output of D flip-flop 162 is then passed to the retime circuit 110.

Retime circuit 110 includes a multiplexer 174 with four data inputs, a selection input and one data output. The MODE signal discussed above in relation to FIG. 2 is provided to the selection input for selecting which of the four data inputs is provided the output. Retime circuit 110 also includes two retime buffers, a first retime buffer 164 and a second retime buffer 166, and a multiplexer 152 with four data inputs and a selection input, and one data output. The selection input is provided with a delay select input from delay select circuitry 150.

The four inputs to multiplexer 174 are provided as follows. A first input is provided to multiplexer 174 directly from the output of D flip-flop 162. This input will be selected when the retime circuit is in mode one operation as described above.

The output from D flip-flop 162 is also fed to a retime buffer 164. Retime buffer 164 is clocked by t-clk, and comprises one or more D flip-flops. The output of retime buffer 164 provides a second input to multiplexer 174, which is selected by the mode signal when the retime circuitry operates in mode three operation described above.

The output retime buffer 164 is connected to a second retime buffer 166. The output of second retime buffer 166 is provided to another one of the four data inputs of multiplexer 174. The input is selected by the mode signal when in mode four operation as described above. Retime buffers 164 and 166 are both clocked by t-clk. In alternative embodiments, a greater number of retime buffers could be connected in series between the data input and the multiplexer 174, or more inputs could be provided to multiplexer 174, allowing different numbers of retime buffers to be selected. The role of these retime buffers is to resynchronize the data signal in modes of operation where the delay line, described below, is not used.

The output of D flip-flop 162 is also passed to delay line 168. Delay line 168 includes three delay elements 170, 171 and 172. Outputs from the delay line 168 are connected to a multiplexer 152. One input to multiplexer 152 is connected directly to the output of D flip-flop 162. A second input to multiplexer 152 is connected after first delay element 172, such that at the second input to multiplexer 152 is the signal from D flip-flop 162 delayed by the value of the first delay element 172.

A third input to multiplexer 152 is taken from the output of the second delay element 171. Delay element 171 is connected to the output of the first delay element 172. In this way, the third input to multiplexer 152 is the output of D flip-flop 162 delayed by two delay element values. A fourth input to multiplexer 152 is taken from the output of a third delay element 170. Accordingly, a delay of three delay element values is provided. The delay elements 170, 171 and 172 may each provide any suitable value of delay. For example, delay elements 170, 171 and 172 may provide a delay of 100 ps. in a system using clocks of the order of 100s of MHz.

The output from multiplexer 152 is applied to a fourth input of multiplexer 174, and is selected when in mode two operation as described above. The purpose of the delay line, as described in more detail below, is to provide fixed delays to the data signal from D flip-flop 162, such that metastability can be avoided without the use of retime buffers. Fewer or a greater number of delay elements may be provided in delay line 168, and fewer or a greater number of inputs to multiplexer 152 may be provided, as will be apparent to those skilled in the art. It should also be appreciated that different numbers of delay elements may be used in different clock cycles. The third delay element 172 preferably allows data to be clocked earlier relative to the clock signal.

The output from multiplexer 174 is provided to a Gray decode block 176. The output of Gray decode block 176 is provided to compare logic 106. Compare logic 106 compares the output from Gray decode block 172 with the output from read pointer 94, which is also shown in FIG. 5. Read pointer 94 contains identical logic to write pointer 92, the only difference being that it is clocked by t-clk, not i-clk, and is controlled by the read control logic 102 of FIG. 5.

Operation of the retime circuit 110 of FIG. 7 will now be described. As explained above, in situations where the clock signals i-clk and t-clk are asynchronous, two retime buffers are required in order to avoid problems of metastability. In this case, mode 4 operation would be entered as described above, and bridge configuration circuit 72 would generate the mode signal such that at multiplexer 174 the output of retime buffer 166 is provided to the Gray decode block 176. This would mean that the write pointer data would be clocked at least twice by t-clk before, once in each retime buffer, before being compared to the output of read pointer 94. By adding a delay of between one and two clock cycles of t-clk to the data signal, latency is added to the system.

If the clock signals i-clk and t-clk are sufficiently related (e.g., one of the clock signals is a low multiple of the other) then no clock synchronization will be required to avoid metastability. For example, when operating in mode 1 described above, the bridge configuration block 72 will provide the mode signal to select the output from D flip-flop 162 provided at the output of multiplexer 174. Accordingly, retiming of the write pointer data would not take place prior to the comparison with the read pointer value.

When clocks t-clk and i-clk are derived from the same master clock, but have a relatively varying phase relationship, one or two retime buffers would be required to retime the signals timed with one clock before they could be considered to be sufficiently stable for use in the second clock environment. However, advantageously in embodiments of the present disclosure, in such cases the second mode of operation described above may be entered. In this mode, the bridge configuration clock 72 provides a mode signal to multiplexer 174 such that the output of multiplexer 152 is provided to Gray decode block 176.

Embodiments of the present disclosure are useful when there is a repeat relationship between the clock signals of each domain. Thus, the varying phase relationship between the clock signals repeats every so often, for example, every fourteen (14) clock cycles. An example of when such a repeat relationship would exist is when the clocks have been derived from the same master clock signal using different divisors. The number of clock cycles before the varying phase relationship repeats could be any number, however the greater the number of clock cycles, the greater the amount of circuitry needed to provide delay select values.

When in mode 2 operation, the delay select signal provided to the selection input of multiplexer 152 selects which of the inputs of multiplexer 152 is supplied to multiplexer 174. The delay elements 170, 171 and 172 allow the timing of the data from flip-flop 162 to be adjusted by one of a number of fixed time values such that clock t-clk does not clock the data close to a data change, which could cause metastability. The delay select signal is produced by delay select logic 150. Delay select logic is shown in detail in FIG. 8.

As shown in FIG. 8, the delay select logic 150 comprises twenty (20) shift registers, which will be referred to as shift registers depth 0 to depth 19. Only four of the shift registers are shown in FIG. 8 for simplicity, shift registers depth 0, 1, 18 and 19, and these are labeled 230, 232, 234 and 236, respectively. The input to each shift register is connected to a first multiplexer, four of which are shown in FIG. 8 and labeled as multiplexers 240, 242, 244 and 246. Each of these first multiplexers has two inputs, one of which is connected to a data value labeled 'sequence_data' in FIG. 8. The multiplexer 246 associated with the depth 0 shift register has its second input provided by the output from the depth 1 shift register 234. The first multiplexer associated with the final shift register in the chain, depth 19 labeled 240, has one input connected to sequence data, and the second input connected to feedback delay select signal. The other first multiplexers associated with the inputs of shift registers depth 1 to depth 18 have their second input connected to a second multiplexer.

Of the second multiplexers, two are shown in FIG. 8, labeled 252 and 250. These second multiplexers have one input connected to a feedback signal from the delay select output of the shift register chain (the output from shift register depth 0), and a second input connected to the output of the next shift register in line. For example, multiplexer 252 associated with shift register depth 1 has its second input connected to the output of shift register depth 2.

The delay select signal in the embodiment of FIG. 7 needs to comprise at least two bits in order to select one of four of the inputs. Therefore, each of the lines connecting blocks in FIG. 8 is two bits wide, and the sequence data also comprises two bits of data. If multiplexer 152 had a different number of inputs then it will be apparent to those skilled in the art that a fewer or greater number of bits would need to be provided in order to select one of the inputs.

The delay select output from the delay select logic is taken from the output of the first shift register in the chain, depth 0, labeled 236. The first multiplexers in FIG. 8 allow sequence data signals to be input to the shift registers depth 0 to 19. The choice of twenty shift registers allows a sequence of twenty delay select values to be provided over twenty clock periods of t-clk, and this sequence is then repeated. Provided that the correlation between i-clk and t-clk repeats at least every twenty clock cycles, this would provide sufficient delay select values for all possible orientations of i-clk and t-clk. If, however, a greater number of shift registers were provided, then the correlation between i-clk and t-clk would not have to repeat as frequently. If fewer shift registers were provided, then the correlation between i-clk and t-clk would have to repeat within less clock periods. Therefore, the choice of the number of shift registers will depend on the i-clk and t-clk signals, and their relationship to each other, as will be more apparent when the generation of i-clk and t-clk is described herein below.

The purpose of the delay select logic shown in FIG. 8 is to provide a series of delay values to multiplexer 152, the series repeating every n clock cycles, where n and the delay values themselves will depend on the repeat relationship between the clock signals of the two domains. In alternative embodiments, rather than using the shift register chain as shown in FIG. 8, the series of delay select values could be provided by software. For example, CPU 12 could be programmed to provide these values, for example, by loading in the pattern used to generate the clocks into the CPU. Alternatively, the function of FIG. 8 can be provided by software.

The sequence data is determined and programmed by a central processing unit (CPU) associated with the bridging circuit, for example, CPU 12 shown in FIG. 1. In alternative embodiments, however, these values could be programmed by the bridge configuration circuit 72. For any pair of clocks i-clk and t-clk, depending on their respective frequencies and phase relationship, between one and twenty 2-bit sequence data values may be provided to the sequence data inputs. Twenty 2-bit sequences is the maximum due to the number of shift registers provided, as will be explained in more detail herein below.

The second multiplexers associated with the shift registers depth 1 to 18 allow the length of shift register chain to be reduced or enlarged from a minimum of 1 shift register to a maximum of twenty shift registers. Accordingly, a sequence of between 1 and 20 data values shift through the line of registers and then repeat.

In order to understand the operation of the retiming circuitry in FIG. 7 in mode 2 operation, and of the delay select logic in FIG. 8, it is useful to understand how clock signals are derived in embodiments of the present disclosure. The most efficient way to supply multiple clocks for different circuits on a chip is to generate a single high frequency clock using a PLL (Phase Locked Loop), and this is then divided down for use in each circuit. However, due to physical limits within a design, the lower the PLL frequency, a fewer number of problems may arise. When only two clocks are required with an integer relationship (for example 50 Mhz and 25 Mhz), a master clock of 100 MHz can be used, as to achieve 50 MHz the clock is divided by 2, and to obtain 25 MHz the 100 Mhz clock is divided by 4.

When there are a large variety of clocks in a design, however, a more flexible divider pattern is needed, and as described in more detail below, a clock divider according to one embodiment may divide a master clock by a factor of anywhere between 2 and 10, in half integer steps, and a factor of between 11 and 20 in integer steps. The division values possible are determined by the number of shift registers provided in the division circuit, as explained below with reference to FIG. 10.

Figure 10:
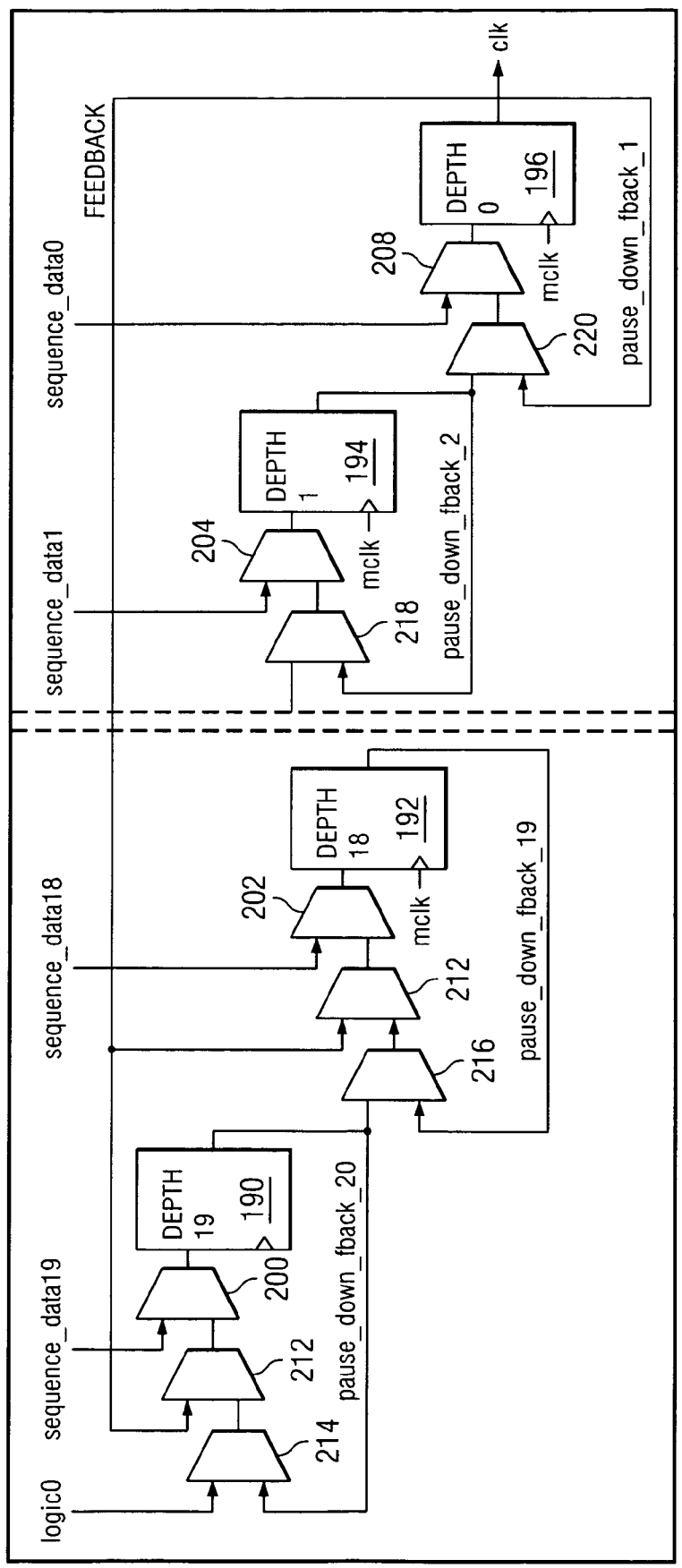
FIG. 10 is a more detailed block diagram showing the delay select logic of FIG. 7.

FIG. 10 illustrates circuitry suitable for deriving clock signals i-clk and t-clk. This circuitry could also be used for the divide chain 46 shown in FIG. 1. As shown in FIG. 10, for generating clock signals a further chain of 20 shift registers are provided. The chain of 20 shift registers are labeled depth 0 to depth 19, and four of these are shown in FIG. 10 labeled 190 to 196. Twenty shift registers allow a master clock to be divided by a factor of between two and twenty in integer steps, or alternatively, as is the case with the circuit of FIG. 10, to divide by a factor of between two and ten, in half integer steps. From the following description of FIG. 10 and its operation, it will be apparent that the circuit of FIG. 10 could be easily altered to include a fewer or greater number of shift registers, allowing a different range of divisions of the master clock to be performed.

The output of the divide chain of FIG. 10 is taken from the output of the first shift register depth 0, labeled 196. As with the delay select logic, each of the depth shift registers is associated with a first multiplexer, one input of which is connected to sequence data. Sequence data in FIG. 10 is generated separately from the sequence data of FIG. 8. Four such first multiplexers are shown in FIG. 10, labeled 200 to 208. These first multiplexers each have two inputs, one input connected to a sequence data input, and a second input. These multiplexers allow sequence data to be clocked into shift registers depth 0 to 19.

Shift registers from depth 0 to depth 9 use a two multiplexer sourcing method for data such that each of these shift registers has a second multiplexer associated with it. Two second multiplexers are shown in FIG. 10 which are labeled 218 and 220. These multiplexers provide the second input to the first multiplexers for shift registers depth 0 to 9. The second multiplexers each have two inputs, one of which is connected to the output of the next shift register in line, and one of which is connected to the output of the current shift register. For example, multiplexer 220 associated with shift register depth 0 labeled 196 has a first input connected to the output of shift register depth 1, and a second input connected to the output from shift register depth 0. These multiplexers allow a number of operations: the shift registers can be loaded with an initial value from software; the feedback value (from 236) can be selected by another flip-flop allowing the line to have a variable length, and each flip-flop can receive its own output, which enables the clock to be paused if necessary.

Shift registers 19 down to 10 use a three multiplexer sourcing method for data. As shown for shift registers 18 and 19, each of these shift registers has associated with it three multiplexers, the first multiplexer and second and third multiplexers. As described above, the first input of the first multiplexers, for example multiplexer 202, is provided by a sequence data input. The first multiplexers allow sequence data to be entered into the shift registers.

The second input of the first multiplexers is provided by the output of the second multiplexer, for example multiplexer 212. The second multiplexers have two inputs, one of which is connected to a feedback signal output from the clock output of the chain (output of shift register depth 0), and the second of which is connected to the output of a third multiplexer, for example multiplexer 216. Second multiplexers allow the length of the shift register chain to be altered between eleven and twenty shift registers. For example, if the feedback signal input to multiplexer 212 is selected, shift register 192 will be the last in the chain, (i.e., the chain will be limited to nineteen registers).

The third multiplexers also have two inputs, one of which is connected to the output of the previous shift register, for example shift register 190 and the second of which is connected to the output of the current shift register, for example shift register 192. In the case of the final shift register in the chain 190, the third multiplexer 214 has its second input connected to a logic zero value. The third multiplexers perform the same role as the second multiplexers associated with the shift registers depth 0 to depth 9, (i.e., the third multiplexers allow a data value to be output and then returned to the input of a shift register and thus effectively hold a value in a shift register for more than one clock cycle).

Each of the shift registers in FIG. 10 is clocked by a master clock labeled Mclk, and this clock is generated by a PLL, for example PLL 44 in FIG. 1. The output of the shift register chain is a clock signal having a frequency value which is a fraction of the master clock.

Operation of the circuitry in FIG. 10 will now be described in conjunction with FIGS. 9A, 9B and 9C which show four examples of clock signals that may be generated. The three examples show the generated signals which are generated by dividing the master clock by four, five and four and a half. From these examples, it will be apparent how the sequence data provided to the shift registers can be programmed, and the multiplexers controlled to allow alternative divisions of the master clock. It will also be apparent that by adding or removing shift registers from the chain, alternative division factors will be possible.

Figure 9A:
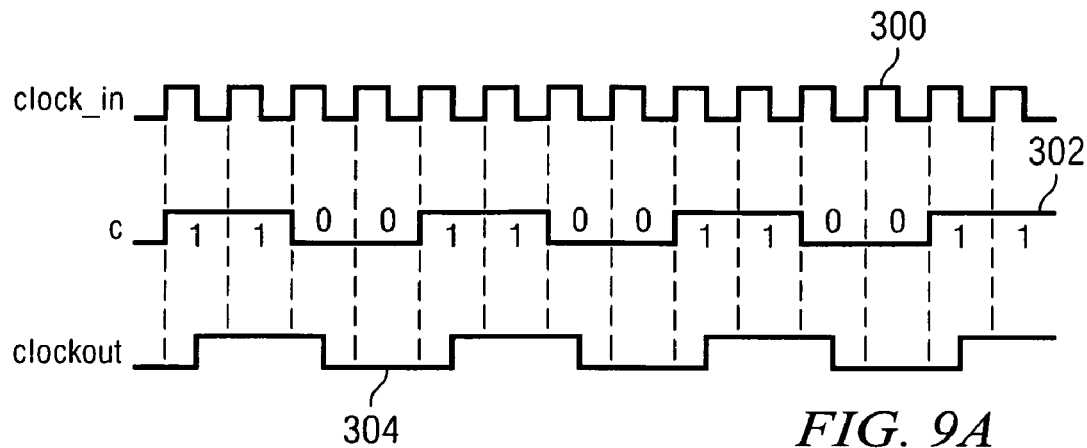
FIGS. 9A to 9C are timing diagrams showing clock signals generated from a master clock.
Figure 9B:
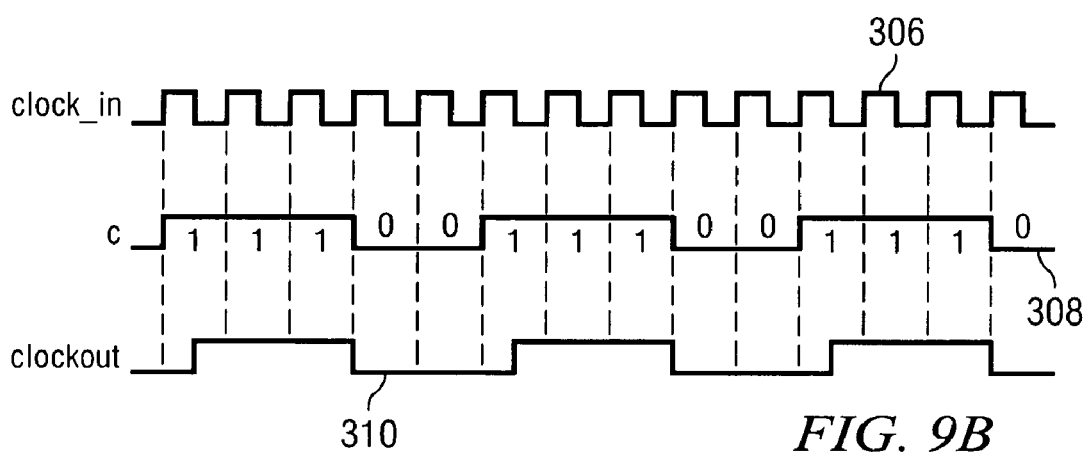
Figure 9C:
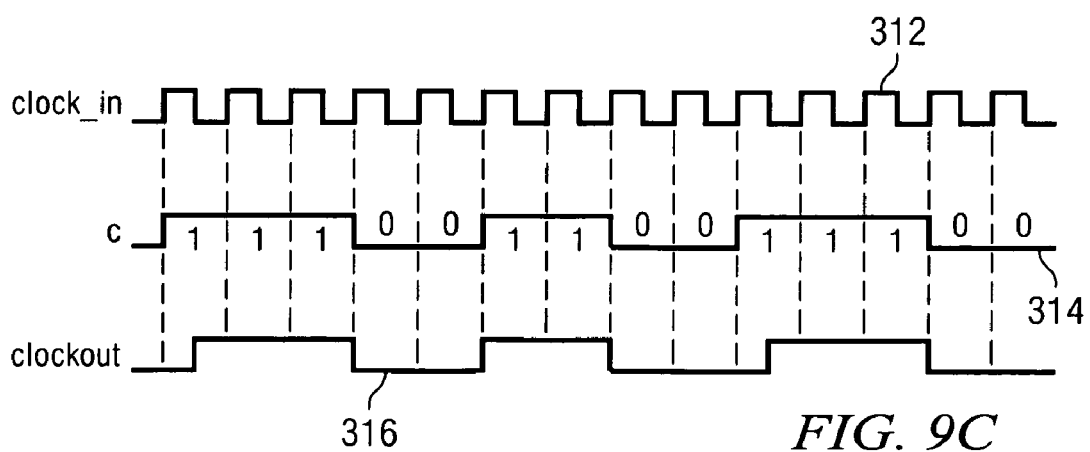

Firstly referring to FIG. 9A, a divide by four output clock signal is shown. In this example, the master clock Mclk to the shift register chain in FIG. 10 is the clock-in signal 300. In the example of FIG. 9A, a clock-out signal is required to have four times the period of the clock-in signal 300, which is one quarter of the master clock frequency. As shown by signal 302, the required output clock may be produced by repeating a pattern of data values again and again. In this case the pattern repeated is '1100'. Given that the pattern is only four values long, only four of the depth shift registers shown in FIG. 10 are required to produce this output signal. Sequence data values labeled sequence data 0 to sequence data 3 will be programmed with values 0,0,1,1 respectively. The sequence data values are programmable by a CPU, or alternatively, bridge configuration block 72. For the first clock cycle of the master clock Mclk, the first multiplexers associated with each of the shift registers 0 to 3 will be set to input the sequence data. These multiplexers may be controlled by control input, provided by the CPU. For example, in FIG. 10 multiplexers 204 and 208 will be controlled to allow sequence data 0 and sequence data 1 to be output to the shift registers. The output clocks are provided by the CPU providing the required sequence program.

Effectively the circuitry of FIG. 10 allows the master clock signal to be amended by a pattern, and provided the pattern repeats itself no less than once every twenty clock cycles, then any pattern within those twenty periods may produced. It is a repetition of the clock signal in relation to the master clock that allows advantageous embodiments of the present invention to reduce the synchronization required. For example, the clock signal in FIG. 9A is the master clock divided by four, and the example shown in FIG. 9B is the master clock divided by five. These clocks have been generated from the same master clock. Therefore, there is a varying phase relationship between the clocks repeats. The repeating relationship in this case will occur every twenty clock cycles of the master clock, or every five clock cycles of the divide by four clock.

Figure 11:
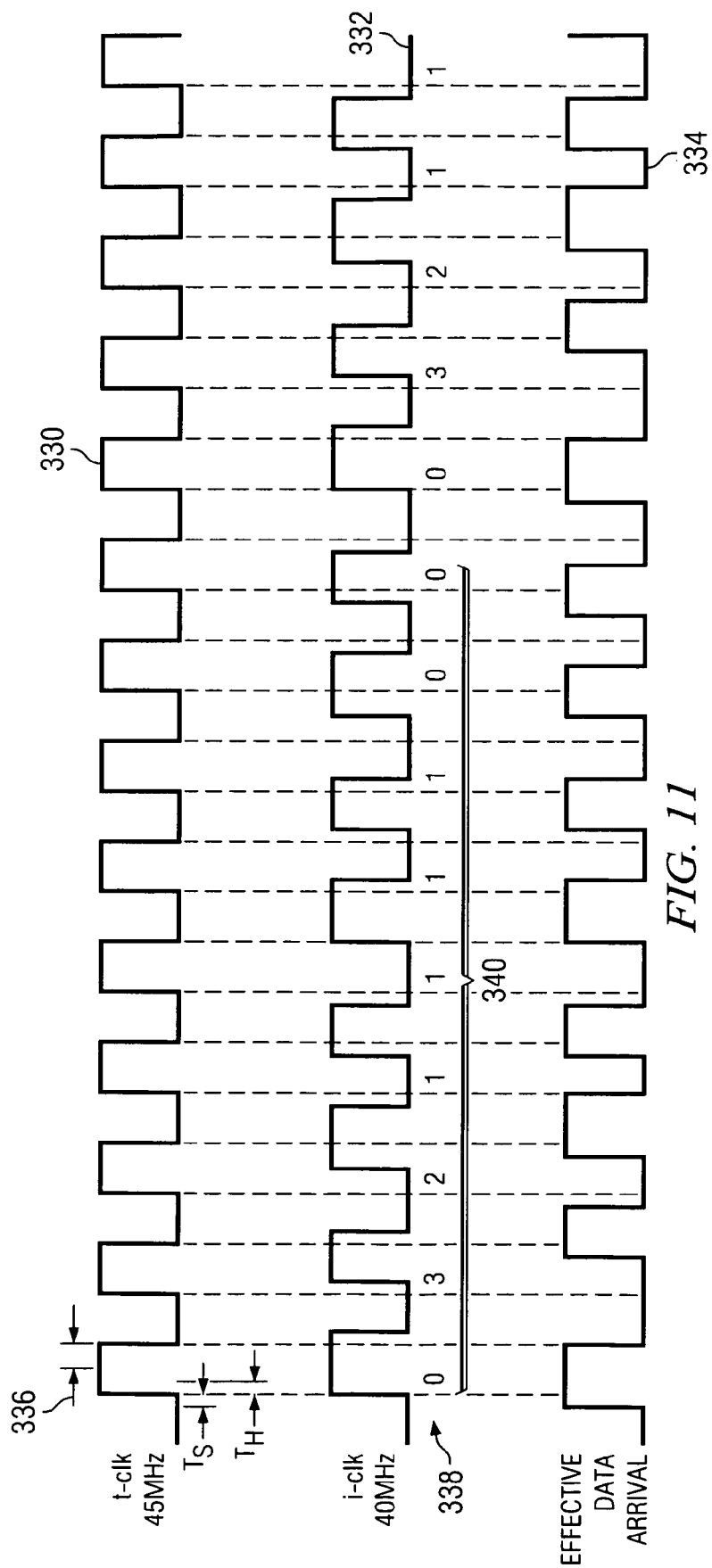
FIG. 11 is a timing diagram illustrating examples of clocking signals generated in one embodiment of the present disclosure.

The operation of the circuitry in FIGS. 7 and 8 will now be described with reference to the example provided by the timing diagram shown in FIG. 11. The diagram shown in FIG. 11 shows an example in which clock t-clk in the target and clock i-clk in the initiator are both derived from a master clock with a frequency of 180 MHz. The period of the master clock is shown labeled 336. In this example, clock t-clk is equal to the master frequency divided by four, and clock i-clk is equal to the master frequency divided by four and a half. Clock signal t-clk is labeled 330, and clock i-clk is labeled 332. Both of these clocks are generated using the circuitry shown in FIG. 10.

Clock i-clk, which clocks D flip-flop 162 of FIG. 7, determines when the write data from the write pointer register 92 will change. Data will change on the rising edge of i-clk. Data will be clocked in the target clock domain on the rising clock edge of clock t-clk, however, if the data changes within a time $T_s$ (setup time) before the rising edge, or within a time $T_h$ (hold time) after the rising edge, then the clocked value will be unknown for a certain period. This creates a period of metastability, during which the output of the circuit is unknown. The setup time $T_s$ and hold time $T_h$ are shown in FIG. 11.

In order to avoid metastability, data must not change within the setup and hold times of the receive circuitry. This is achieved according to embodiments of the present disclosure by adjusting the arrival time of the data such that it does not fall within this period. This adjustment is performed by the delay elements 170, 171 and 172 of FIG. 7.

Setup and hold times vary between devices. However, the delay created by delay elements should be chosen such that for the circuit in question, sufficient changes in the data arrival time to avoid these periods are allowed. In the example of FIG. 11, the delay elements each provide a fixed delay equal to half the master clock period. The choice of delay will depend on the setup and hold requirements of the comparison circuit, and the number of delay values in the delay chain. By adding the maximum possible delay to the data signal, it should be possible to avoid all cases of metastability. However, by providing for the selection of lower delays and to avoid metastability, a reduction in the latency of the system can be achieved when only a small delay to the data signal is required.

As clocks t-clk and i-clk have been derived from the same master clock, there will be a period every so often when the clocks are in phase. In the example of FIG. 11, the period required to achieve clocks in phase is every nine (9) clock cycles. The offset of the rising edges of the respective clocks will vary within that nine (9) clock cycle period, however, the offsets will repeat every nine (9) cycles. This means that any point at which rising edges are close and could cause metastability, it will be repeated every 9 cycles and therefore may be rectified. If the i-clk and t-clk signals had different frequencies, the phase relationship or correlation between the signals might repeat more often than every nine clocks cycles, or less often. However, if the relationship repeated less often than every twenty clock cycles, more shift registers would be required in the delay select circuitry to provide the correct number of data select values. Assuming that the clocks have been derived from division circuitry as shown in FIG. 10 with no more than n shift registers (n=twenty in the example of FIG. 10), then the relationship between the clocks will always repeat at least every n clock cycles, and therefore n shift registers would be sufficient in the delay select circuitry.

According to embodiments of the present disclosure the CPU is programmed to spot points when metastability might be a problem. This can be achieved by using the information used to generate the clock. Alternatively, this may be accomplished with human input. For each of the rising edges of the target clock t-clk, it is determined whether there is a data change caused by the initiator rising edge close by. The data may then be delayed by one, two or minus one delay element value in order to prevent metastability. Where no problem is likely to occur, no delay is programmed, and the input labeled 1 of multiplexer 152 is selected. Where a problem is possible, a single positive or negative delay is programmed, by selecting inputs 2 or 0 of multiplexer 152 respectively. If there is a serious likelihood of metastability, two delays may be programmed by selecting input 3 to multiplexer 152. The inputs 0 to 3 of multiplexer 152 are selected by a delay select value of 0 to 3, respectively.

The delay select values for the example in FIG. 11 are shown in line 338. For example, in relation to the first clock period, the rising edges of clock i-clk and t-clk fall at the same time, and a negative delay of the data is required to prevent a possible occurrence of metastability. Therefore, input 0 of multiplexer 152 is selected. For the following rising clock edge of t-clk, there is a high risk, and therefore input 3 is selected. As shown in FIG. 11, delay values are selected for each rising edge of t-clk, and these values repeat after 9 rising edges.

The signal 334 in FIG. 11 shows the effective data arrival time of the data from the initiator clock domain. Whilst in this example the values chosen for the delays have prevented metastability, other delay values are also possible that prevent metastability.

As explained above, the delay select values may be determined by a CPU or programmed by a user. Binary forms of these values are then provided to the sequence data inputs of FIG. 8. In the current example, only nine of the shift registers, registers depth 0 to depth 8 are required to produce the repeated code pattern. The nine values labeled 340 in FIG. 11 will be programmed into the sequence data inputs for these nine shift registers. Operation of the circuit in FIG. 8 will now be described.

The first multiplexers associated with shift registers depth 0 to depth 8 will each be controlled to input the sequence data on the first clock period, and then they will be controlled to input data from their second input on subsequent clocks. Once sequence data has been loaded it will circle through the shift registers. To achieve this, the second multiplexers associated with shift registers depth 1 to depth 7 will be controlled to output the input from the next shift register in line. The second multiplexer associated with the shift register depth 8 will be controlled to receive the feedback signal from the delay select output, thereby closing the loop such that the data circulates through the nine registers. The delay select output will then change on each rising edge of the t-clk clock to the next value in the pattern, and repeat the pattern after the ninth delay value has been output.

Embodiments of the present disclosure have been described in the context of an integrated circuit. At least part of embodiments of the present disclosure may be implemented in discrete circuitry. At least part of embodiments of the present disclosure may alternatively or additionally be implemented in software.

It will be appreciated that only one example of the present disclosure has been explained in detail and that many changes and modifications may be made to the example described and shown in the drawings.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A circuit for retiming a data signal transmitted from a first environment under control of a first clock signal to a second environment under control of a second clock signal, the circuit comprising:
   a plurality of delay elements for said data signal, the delay elements controlled by the first clock signal;
   a plurality of inputs connected to said delay elements for receiving said data signal at respectively different delays;
   a multiplexer to select the data signal at one of said inputs based on a delay select value, the delay select value controlled by the second clock signal,
   wherein said first and second clock signals have a known repeat relationship and wherein a varying phase relationship between said first and second clock signals repeats;
   a delay select logic circuit to provide delay select values, said delay select values depending on said known repeat relationship, each one of said delay select values defining the delay to be provided in a given clock cycle; and
   an output for said selected data signal.

2. The circuit of claim 1, wherein said delay select logic circuit comprises a chain of registers arranged to store delay selection values for selecting said data signal and outputting a sequence of said delay selection values.

3. The circuit of claim 2, wherein each of said registers in said chain comprises an input such that a delay selection value may be stored in each register.

4. The circuit of claim 3 further comprising:
   a processor to determine said delay selection values and connected to output said values to said registers in said chain.

5. The circuit of claim 2, wherein said multiplexer comprises a second multiplexer to control the number of active registers in said chain of registers.

6. The circuit of claim 1 further comprising:
   a division circuit connected to generate the first and second clock signals at respective outputs by division of a master clock signal, said outputs connected to control the delay elements and the delay select value.

7. The circuit of claim 1, wherein each of said delay elements comprises an input terminal and an output terminal, each delay element being arranged to delay an input signal from its input terminal by a fixed delay, and to output said delayed signal to its output terminal.

8. The circuit of claim 7, wherein said delay elements are connected in a chain and the output terminal of each delay element is connected to one of said plurality of inputs.

9. The circuit of claim 1 further comprising:
   at least one retime buffer to receive said data input signal; and
   multiplexing circuitry comprising:
      a first multiplexer input connected to said retime buffer;
      a second multiplexer input connected to said output;
      a multiplexer output; and
      a second selector to select a signal at one of said multiplexer inputs for output at said multiplexer output.

10. The circuit of claim 1, wherein said data input signal is one of:
- a read pointer value; and
- a write pointer value.

11. The circuit of claim 1, further comprising:
- a Gray encode block connected to encode the data signal; and
- a Gray decode block connected to decode said data signal.

12. A bridge circuit comprising said circuit recited in claim 1.

13. A method of retiming a data signal transmitted from a first environment under control of a first clock signal to a second environment under control of a second clock signal, said first and second clock signals having a known repeat relationship wherein the varying phase relationship between said first and second clock signals repeats with a known frequency, said method comprising:
- delaying said data signal by different delays to generate a set of delayed data signals, the delayed data signals under control of the first clock signal;
- selecting one of said delayed data signals based on said known repeat relationship and according to the second clock signal; and
- outputting said selected data signal.

14. The method of claim 13, wherein said delaying said data signals is accomplished with a chain of registers arranged to store delay selection values for selecting said data signal and outputting a sequence of said delay selection values.

15. The method of claim 14, wherein each of said registers in said chain comprises an input such that a delay selection value may be stored in each register.

16. The circuit of claim 15 further comprising:
- determining said delay selection values and output said values to said registers in said chain.

17. The method of claim 14 further comprising:
- controlling the number of active registers in said chain of registers.

18. The method of claim 13 further comprising:
- generating the first and second clock signals by division of a master clock signal.

19. The method of claim 13, wherein said delaying said data signal is accomplished with a delay element comprising an input terminal and an output terminal, each delay element being arranged to delay an input signal from its input terminal by a fixed delay, and to output said delayed signal to its output terminal.

20. The method of claim 19 further comprising:
- connecting said delay elements in a chain and the output terminal of each delay element is connected to one of said plurality of inputs.

21. An integrated circuit comprising a circuit for retiming a data signal transmitted from a first environment under control of a first clock signal to a second environment under control of a second clock signal, the integrated circuit comprising:
- a plurality of delay elements for delaying said data signal, the delay elements controlled by the first clock signal;
- a plurality of inputs connected to said delay elements for receiving said data signal at respectively different delays;
- a multiplexer to select the data signal at one of said inputs based on a delay select value, the delay select value controlled by the second clock signal,
- wherein said first and second clock signals have a known repeat relationship wherein a varying phase relationship between said first and second clock signals repeats;
- a delay select logic circuit to provide delay select values, said delay select values depending on said known repeat relationship, each one of said delay select values defining the delay to be provided in a given clock cycle; and
- an output for said selected data signal.

* * * * *

UNITED STATES PATENT AND TRADEMARK OFFICE
CERTIFICATE OF CORRECTION

| | | |
|---|---|---|
| PATENT NO. | : 7,555,590 B2 | |
| APPLICATION NO. | : 11/545079 | |
| DATED | : June 30, 2009 | |
| INVENTOR(S) | : Paul Elliot and Peter Bennett | |

It is certified that error appears in the above-identified patent and that said Letters Patent is hereby corrected as shown below:

Column 19, Claim 16, line 36, delete "circuit" and replace with -- method --.

Signed and Sealed this
Twenty-fourth Day of May, 2011

David J. Kappos
*Director of the United States Patent and Trademark Office*